United States Patent
Brown et al.

(10) Patent No.: US 6,259,682 B1
(45) Date of Patent: Jul. 10, 2001

(54) CLOSED LOOP TRANSMITTER WITH IMPROVED STABILITY AND ACCURACY OVER A WIDE RANGE OF POWER LEVELS HAVING MEANS FOR MAINTAINING CONSTANT LOOP GAIN

(75) Inventors: Stephen J. Brown, San Diego; Hoi Nguyen, Lemon Grove, both of CA (US)

(73) Assignee: Uniden America Corporation, Fort Worth, TX (US)

( * ) Notice: Subject to any disclaimer, the term of this patent is extended or adjusted under 35 U.S.C. 154(b) by 0 days.

(21) Appl. No.: 08/977,953

(22) Filed: Nov. 25, 1997

(51) Int. Cl.$^7$ ........................................ H04B 1/00
(52) U.S. Cl. ............................ 370/311; 455/522
(58) Field of Search .................... 370/310, 311, 370/313, 320, 321, 331, 297; 375/1; 455/126, 522, 69, 127

(56) References Cited

U.S. PATENT DOCUMENTS

| | | | |
|---|---|---|---|
| 5,107,225 | * 4/1992 | Wheatley, III et al. | 330/279 |
| 5,129,098 | * 7/1992 | McGirr et al. | 455/69 |
| 5,267,262 | * 11/1993 | Wheatley, III | 375/1 |
| 5,376,895 | * 12/1994 | Aihara | 330/129 |
| 5,490,057 | * 2/1996 | Vinciarelli et al. | 364/157 |
| 5,564,087 | * 10/1996 | Cygan et al. | 455/126 |
| 5,590,418 | * 12/1996 | Holoubek et al. | 455/126 |
| 5,862,460 | * 1/1999 | Rich | 455/116 |

* cited by examiner

Primary Examiner—Chau Nguyen
Assistant Examiner—Alexander O. Boakye
(74) Attorney, Agent, or Firm—William J. Benman

(57) ABSTRACT

A power control circuit for use with a closed loop transmitter such as a cellular telephone. The inventive circuit includes an amplifier for varying the output power level of the transmitter output signal. The amplifier includes an input terminal and a gain control terminal. The transmitter output is fed back to the gain control terminal of the amplifier by a feedback loop. The feedback loop includes circuitry for adjusting the response thereof in response to a loop gain control signal. A control system is included for receiving a power level control signal over a predetermined range of transmitter output power levels and providing the loop gain control signal in response thereto whereby the feedback loop has a linear gain response over the predetermined range of output power levels. In the illustrative embodiment, the system is adapted for use in a mobile station of a cellular telephone system to which a power level control signal is supplied by a base station thereof. The amplifier includes a first variable gain amplifier. The feedback loop includes a detector, a second variable gain amplifier or variable attenuator, an integrator implemented with a low pass filter, and a comparator. The second variable gain amplifier is digitally controlled by a microprocessor in the control system to adjust the output of the detector. The microprocessor controls the gain of the second variable gain amplifier so that the output thereof is linear over a range of power level control signals applied by a base station. The output of the power detector is compared to a reference voltage supplied by the control system in response to the power level control signal applied by the base station. The output of the comparator is input to the gain control input of the first variable gain amplifier.

12 Claims, 4 Drawing Sheets

CLOSED LOOP TRANSMITTER WITH IMPROVED STABILITY AND ACCURACY OVER A WIDE RANGE OF POWER LEVELS HAVING MEANS FOR MAINTAINING CONSTANT LOOP GAIN

BACKGROUND OF THE INVENTION

1. Field of the Invention

The present invention relates to mobile communications systems. More specifically, the present invention relates to systems and techniques for controlling the power radiated by cellular transmitters.

2. Description of the Related Art

In a cellular network a large number of mobile telephone system users, each having a cellular phone, communicate through repeaters or terrestrial stations organized in a number of cells which extend over a limited geographical area. The terrestrial stations are referred to as 'base stations'.

Each mobile station (MS), e.g. cellular telephone, broadcasts a signal that is received by a base station. The signal is then relayed to a mobile switching center (MSC) which in turn routes the signal to the public switched telephone network (PTSN) and to telephone lines or other mobile stations. Similarly, a signal may be transmitted from the public switched telephone network to a mobile station via a base station and a mobile switching center.

In certain cellular systems such as GSM (Global Systems for Mobile Communication) there is a requirement to control, inter alia, the radio frequency (RF) power level of each cellular telephone transmitter in order to maximize the capacity of the system. The output power must be controlled over a wide range i.e., 30–40 dB.

One conventional technique for effecting control of the power level of each cellular phone is a closed loop approach wherein a signal is transmitted from a base station which sets the required output power level. The conventional, closed loop approach involves a feedback of the transmitter output to the input thereof via a peak detector, comparator, and variable gain amplifier.

However, this technique has been somewhat problematic inasmuch as the peak detector is generally implemented with a diode and a low pass filter. The response curve of the diode, with regard to its output voltage as a function of input power, is nonlinear over a wide range of input power levels. The nonlinearity is most extreme at low power levels. As a result, the feedback loop is nonlinear and extremely sensitive at low power levels. Inasmuch as the control voltage is typically applied using a digital-to-analog converter or 'DAC', a high resolution DAC is required to provide adequate resolution in the control of the applied voltage at the low end where the detector is most sensitive. Moreover, to ensure loop accuracy is maintained, steps must be taken to ensure the closed-loop remains stable. Methods such as changing the loop gain of the transmitter have been employed with limited success.

Hence a need exists in the art for an inexpensive system or technique for controlling the output power of a cellular telephone transmitter.

SUMMARY OF THE INVENTION

The need in the art is addressed by the present invention which in a most general sense is a power control circuit for use with a closed loop transmitter such as a cellular telephone. The inventive circuit includes an amplifier for varying the output power level of the transmitter output signal. The amplifier includes an input terminal and a gain control terminal. The transmitter output is fed back to the gain control terminal of the amplifier by a feedback loop. The feedback loop includes circuitry for adjusting the gain of the feedback path in response to a loop gain control signal. A control system is included for receiving a power level control signal over a predetermined range of transmitter output power levels and providing the loop gain control signal in response thereto whereby the feedback loop has a linear gain response over the predetermined range of output power levels.

In the illustrative embodiment, the system is adapted for use in a mobile station of a cellular telephone system to which a power level control signal is supplied by a base station or a self-determinant control algorithm. The amplifier includes a first variable gain amplifier. The feedback loop includes a detector, a second variable gain amplifier or variable attenuator, an integrator implemented with a low pass filter, and a comparator. The second variable gain amplifier is digitally controlled by a microprocessor in the control system to adjust the output of the detector. The microprocessor controls the gain of the second variable gain amplifier so that the output of the detector thereof is linear over a range of power level control voltages applied by a base station or control algorithm. The output of the power detector is compared to a reference voltage supplied by the control system in response to the power level control voltages applied by the base station. The output of the comparator is input to the gain control input of the first variable gain amplifier.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
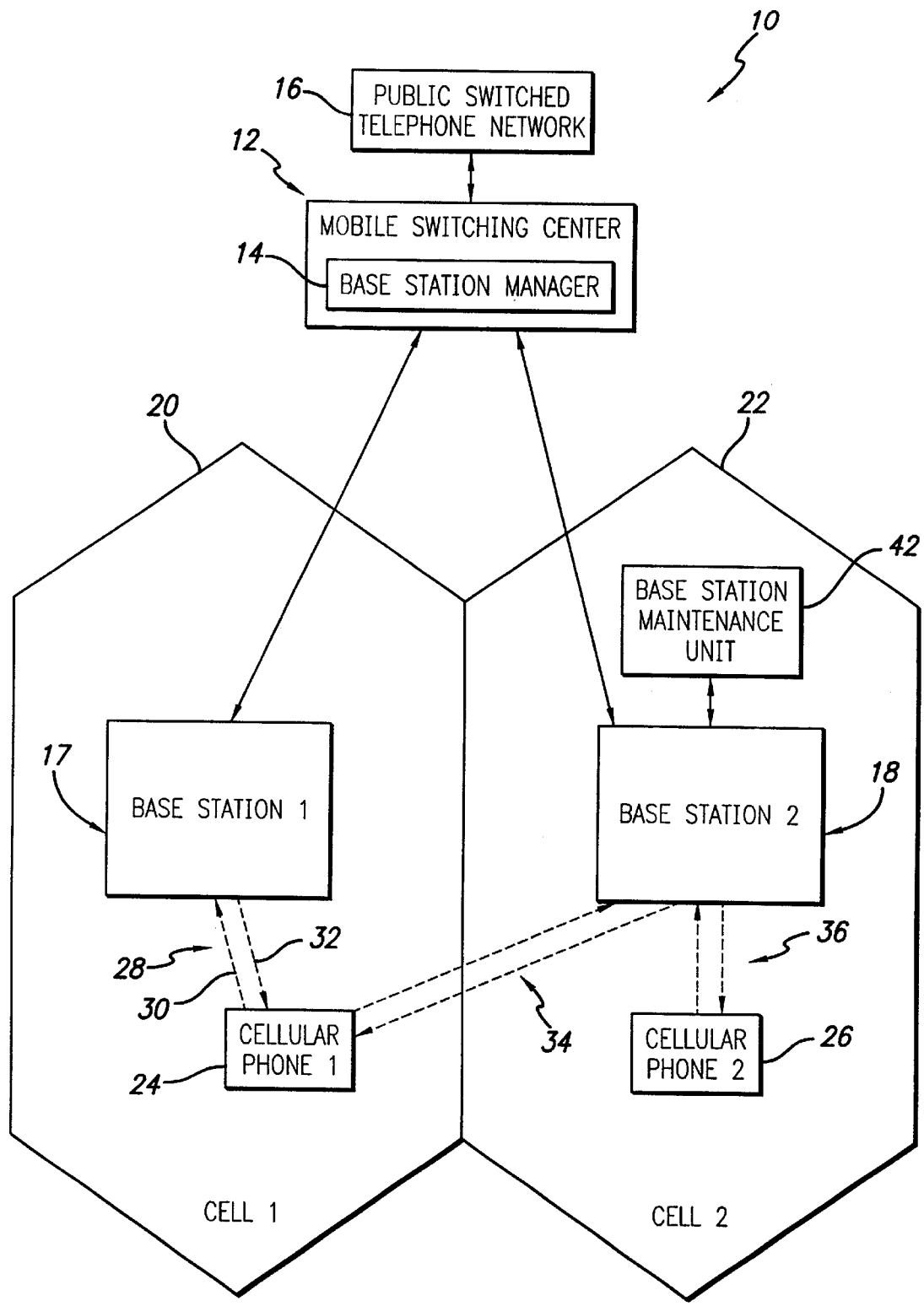
FIG. 1 is a block diagram of a cellular communications system constructed in accordance with the teachings of the present invention.

FIG. 1 is a block diagram of a cellular telephone system 10 constructed in accordance with the teachings of the present invention. The system 10 includes a plurality of mobile switching centers which communicate with a plurality of base stations in a number of cells as will be appreciated by those of ordinary skill in the art. In FIG. 1, a single mobile switching center is depicted along with two cells for the purpose of simplification. Those skilled in the art will appreciate that in practice, multiple switching centers and cell sites would be employed.

In FIG. 1, each mobile switching center (MSC) 12 is managed by a base station manager (BSM) 14. A public switched telephone network (PSTN) 16 routes calls from telephone lines and other networks (not shown) to and from the MSC 12. The MSC 12 routes calls from the PSTN 16 to and from the base stations (BTS) 17 and 18 associated with a first and second cells 20 and 22 respectively. In addition, the MSC 12 routes calls between base stations 17 and 18, i.e., from a source base station 17 to a target base station 18 and vice versa.

The source base station 17 directs calls to a first mobile station 24 within the first cell 20 via a first communications link 28. The communications link 28 is a two-way link having a forward link 32 and a reverse link 30. Typically when the base station 17 has established voice communications with the mobile station 24, the link 28 is characterized as a traffic channel. Although each base station 17, 18 is associated with only one cell, a base station often governs or is associated with several cells.

When the mobile station 24 moves from the first cell 20 to the second cell 22, the mobile station 24 is handed off to the target base station 18. In a soft hand-off, the mobile station 24 establishes a second communications link 34 with the target base station 18 in addition to the first communications link 28 with the source base station 17. When mobile station 24 has crossed into the second cell 22, it may drop the first communications link 28.

In a hard hand-off, the communications link 34 is not established. When the first mobile station 24 moves from the first cell 20 to the second cell 22, the link 28 to the source base station 17 is dropped and a new link is formed with the target base station 18. The communications links 28, 34, and 36 are Air-Interface radio links.

Figure 2:
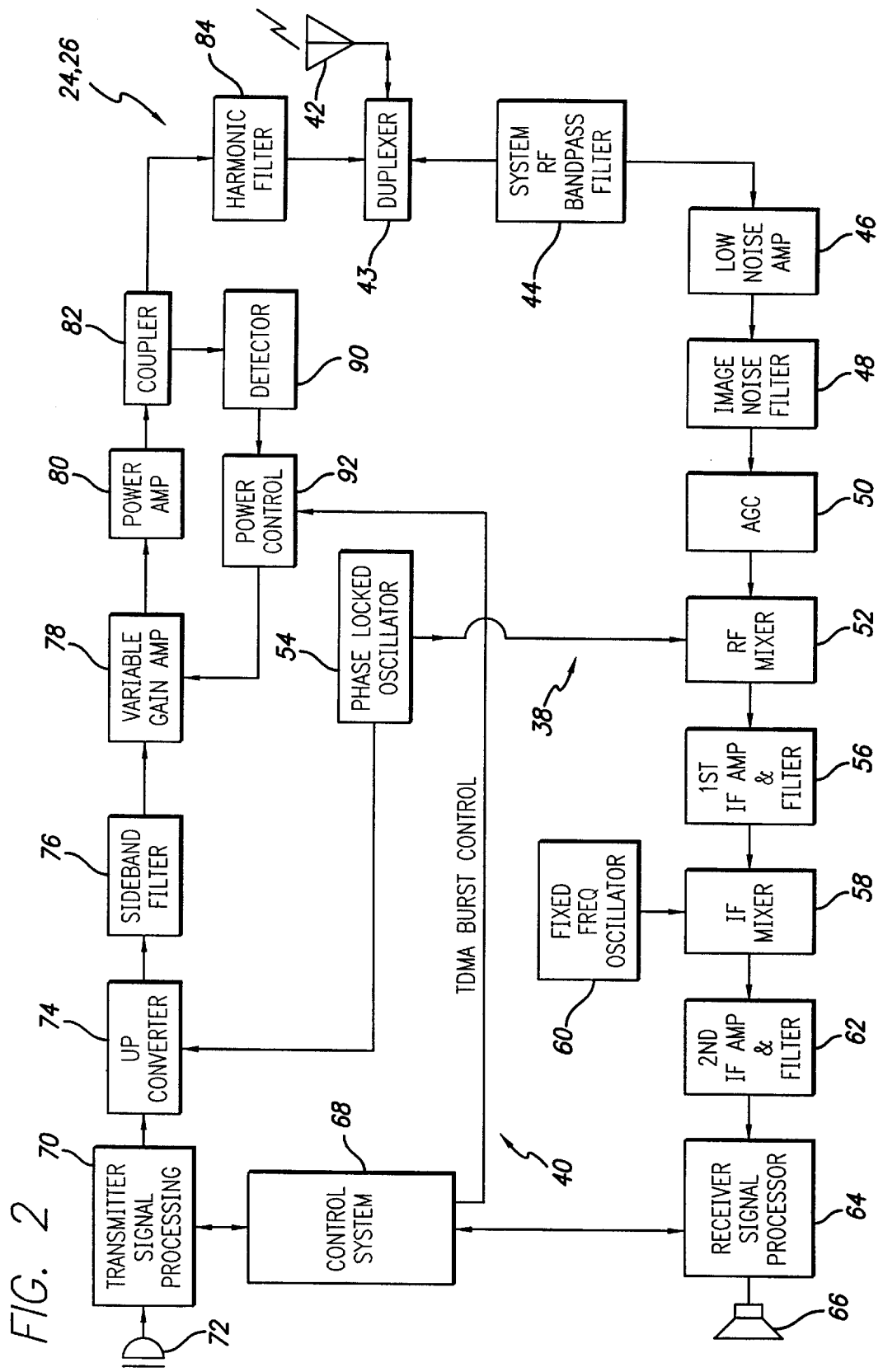
FIG. 2 is a simplified block diagram of a cellular telephone transceiver constructed in accordance with the teachings of the present invention.

FIG. 2 is a simplified block diagram of an illustrative cellular telephone transceiver constructed in accordance with the teachings of the present invention. Each cell phone (mobile unit) 24, 26 includes a receiver 38 and a transmitter 40. The receiver 38 includes an antenna 42 which feeds a received signal to a system of bandpass filters 44 via a duplexer 43. The output of the bandpass filter 44 is input to a low noise amplifier 46. An image noise filter 48 filters the output of the amplifier 46 and passes the filtered signal to an automatic gain control (AGC) circuit 50. The gain controlled signal is downconverted to an intermediate frequency by an RF mixer 52 using an input from a phase locked oscillator 54. The IF signal is amplified and filtered by a first IF amplifier and filter circuit 56 and input to an IF mixer 58. The IF mixer 58 demodulates the signal using an input from a fixed frequency oscillator 60 and provides the demodulated IF signal to a second IF amplifier and filter circuit 62. The output of the second IF amplifier and filter circuit 62 is input to a receiver signal processor 64 which processes the input signal in a conventional manner and provides outputs to a speaker 66 and to a control system 68.

The control system 68 is operationally coupled to a transmitter signal processing circuit 70 and operates therewith in a conventional manner. The transmitter signal processing circuit also receives input from a microphone or data source 72 to receive an electrical input signal representing a speaker's voice or a source of data. The output of the transmitter signal processing circuit 70 is provided to an upconverter 74. The upconverter mixes the input signal with a signal provided by a phase locked oscillator 54. The output of the upconverter 74 is input to a sideband filter 76. The filtered output of the sideband filter is input to a variable gain amplifier 78 or a power amplifier whose output power can be adjusted. The output of the variable gain amplifier 78 is input to a power amplifier 80. The output of the power amplifier 80 is input to a harmonic filter 84 via a coupler 82. The harmonic filter output is fed to the duplexer 43 (or transmit/receive switch) and output via the antenna 42.

The signal output by the amplifier 80 is coupled to a feedback loop comprising a peak detector 90 and a power control circuit 92. As discussed more fully below, the power control circuit 92 receives the power control signal from the control system 68 and outputs a gain control signal to the variable gain amplifier 78.

Figure 3:
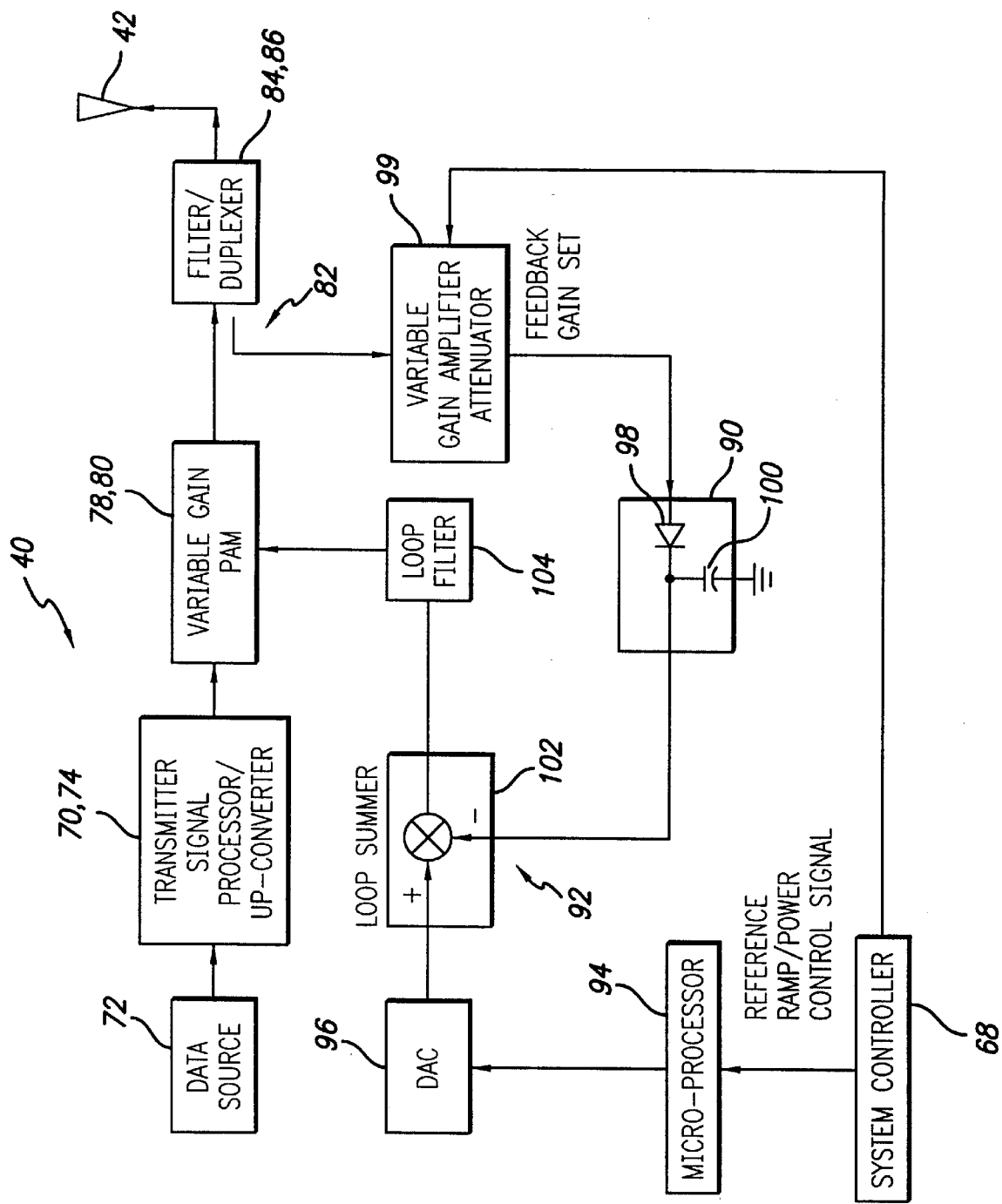
FIG. 3 is a simplified block diagram of the transmitter section of the cellular telephone showing the control system and the power control circuits in greater detail.

FIG. 3 is a simplified block diagram of the transmitter section 40 of the cellular telephone showing the control system and the power control circuits in greater detail. As shown in FIG. 3, the control system 68 feeds a microprocessor 94 which provides digital words to a digital-to-analog converter (DAC) 96. The DAC converts the digital word to an analog voltage which is provided to the power control circuit 92 as the output power control signal mentioned above.

The detector 90 includes a diode 98 and a capacitor 100. The diode 98 and the capacitor 100 are connected in a conventional manner to provide a peak detector. The output of the detector 90 is input to the power control circuit 92.

The power control circuit 92 includes a loop summer 102 and a loop filter 104. The summer 102 receives the output of the detector 90 and subtracts it from a reference voltage $V_{ref}$ supplied by the DAC 96. The loop filter 104 integrates the output of the summer 102 and sets the feedback loop response time. Those skilled in the art will appreciate that other circuits (such as a comparator) may be used in lieu of the loop summer. The output of the filter 104 is used to set the gain of the variable gain amplifier 78.

Power level control is effected by the transmission of a power level command by a base station 17 or 18 which is received by a cell phone receiver 38 and input to the control system 68 of FIGS. 2 and 3. The microprocessor 94 of the control system 68 then inputs the power level command into the DAC 96, which should be selected to cover the entire range of output power levels. The DAC 96 supplies a reference voltage $V_{ref}$ to the power control circuit 92 which sets the gain of the transmitter in the manner described above.

Figure 4:
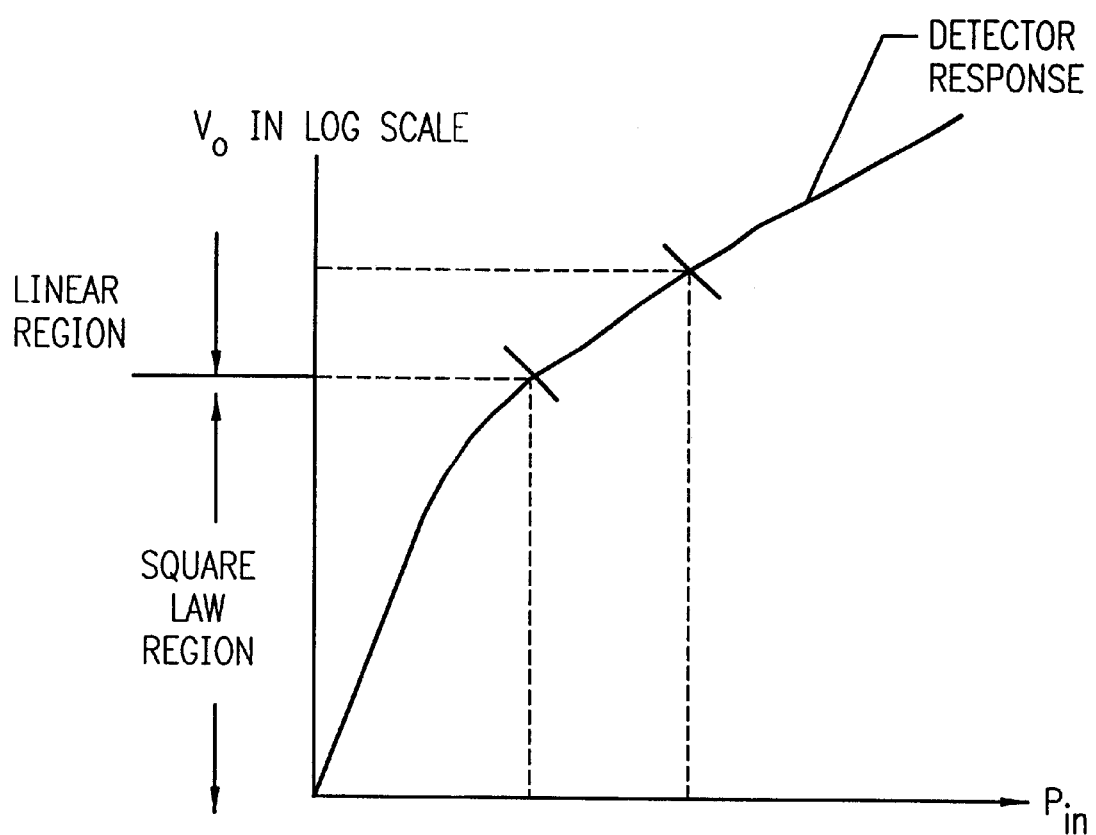
FIG. 4 is a graph of the typical DC output ($V_o$ in log scale) of the diode detector of the transmitter of the mobile station of the present invention as a function of RF input power.

Inasmuch as diodes are commonly used in peak detectors in the illustrative embodiment of the present invention and in closed loop transmitters in cellular phones of conventional design, the detector section 90 suffers from a nonlinearity as depicted in FIG. 4. As a result, the feedback loop is nonlinear and extremely sensitive at low power levels. These nonlinearities can cause the loop to go unstable. At the least, the gain of the loop is affected in a nonlinear manner thus compromising the accuracy of the loop.

The present invention addresses this problem by varying the gain of the feedback path such that the loop gain is maintained at a constant level. This is achieved by the addition of a variable gain amplifier 99 in the feedback loop between the detector 90 and the low pass filter 102 in the power control circuit. (See FIG. 3.) The gain of the amplifier 99 is controlled by the control system 68.

In operation, the gain of the amplifier 99 is initially set to minimum by the microprocessor 94. This provides minimum gain in the feedback path and maximum forward path gain. This is therefore the maximum output power. The loop dynamics can now be set up. To control the power, it is only necessary to vary the gain (i.e., increase the gain in the feedback path) and the reference input can remain unchanged. The loop gain is now held constant by the microprocessor 94 which varies the attenuation in synchronism with the gain in the forward path. As the loop gain is constant, the loop dynamics have not changed therefore stability is maintained over the range of power levels required. Moreover, since the loop gain is constant, the accuracy of the loop is also unchanged, i.e., the loop maintains its accuracy and stability over the range of power levels required.

There are numerous advantages to this design. First, since the loop gain remains constant, the stability margins of the loop are maintained over a wide range of power levels. Therefore, after a stable loop filter configuration is found, it does not need to be adjusted for different power levels.

Secondly, since the loop gain remains constant, the accuracy of the loop remains constant. Therefore, the shape of the transmit burst can be replicated over various power levels. This allows the shape of the reference control voltage to be constant and unchanged for different power levels.

Thirdly, the detectors typically have a limited region where the output voltage is linear with the RF input power. (See FIG. 4). As a consequence of varying the gain of the feedback path, the power level into the RF diode is now constant. Hence, maintaining a linear response from the power detector over a wide range of power levels should be more achievable. The effect of the nonlinearity associated with typical diode detectors should be reduced and a more stable loop arrangement achieved.

The microprocessor 94 is programmed to control the gain of the variable gain amplifier 99 so that the gain of the power amplifier and the feedback gain remains constant over a wide range of power levels. The open-loop gain therefore remains constant. This maintains stability margins constant so that loop filter parameters need not be changed. The result is a linear loop gain as depicted in FIG. 4.

Thus, the present invention has been described herein with reference to a particular embodiment for a particular application. Those having ordinary skill in the art and access to the present teachings will recognize additional modifications applications and embodiments within the scope thereof. For example, the variable gain amplifier can be implemented with or replaced by digitally programmable RF attenuators.

It is therefore intended by the appended claims to cover any and all such applications, modifications and embodiments within the scope of the present invention.

Accordingly,

What is claimed is:

1. A power control circuit for use with a transmitter comprising:

a first variable gain amplifier for varying the output power level of a transmitter output signal, said amplifier including an input terminal and a gain control terminal;

a feedback loop for locally feeding the output of said transmitter to said gain control terminal of said amplifier said feedback loop including means for adjusting the response thereof in response to a loop gain control signal, a second variable gain amplifier, and a peak detector for detecting a peak amplitude of said output signal, the output of said peak detector being input to a subtractor; and control means for receiving a power level control signal over a predetermined range of transmitter output power levels and providing said loop gain control signal in response thereto whereby said feedback loop has a linear gain response over said predetermined range of output power levels.

2. The invention of claim 1 wherein said feedback loop includes a variable attenuator.

3. The invention of claim 1 wherein said second variable gain amplifier is a digitally controlled amplifier.

4. The invention of claim 1 wherein said control means includes a microprocessor.

5. The invention of claim 4 wherein an output of said microprocessor provides a second input to said subtractor.

6. The invention of claim 5 wherein the output of said subtractor is input to an integrator.

7. The invention of claim 6 wherein said integrator is a low pass filter.

8. The invention of claim 6 wherein the output of said integrator is input to a control terminal of said amplifier means.

9. The invention of claim 8 wherein said control means includes a digital-to-analog converter.

10. The invention of claim 9 wherein the output of said digital-to-analog converter provides said second input to said subtractor.

11. The invention of claim 1 whereby said transmitter is a mobile station of a cellular telephone system.

12. The invention of claim 1 whereby said power level control signal is supplied by a base station of a cellular telephone system.

* * * * *